United States Patent
Bellusci et al.

(10) Patent No.: US 10,508,920 B2
(45) Date of Patent: Dec. 17, 2019

(54) PEDESTRIAN DEAD RECKONING POSITION TRACKER

(71) Applicant: XSENS HOLDING B.V., Enschede (NL)

(72) Inventors: Giovanni Bellusci, Hengelo (NL); Jeroen D. Hol, Hengelo (NL); Per Johan Slycke, Schalkhaar (NL)

(73) Assignee: XSENS HOLDING B.V., Enschede (NL)

( * ) Notice: Subject to any disclaimer, the term of this patent is extended or adjusted under 35 U.S.C. 154(b) by 1219 days.

(21) Appl. No.: 14/532,750

(22) Filed: Nov. 4, 2014

(65) Prior Publication Data

US 2016/0123738 A1 May 5, 2016

(51) Int. Cl.
  *G01C 21/16* (2006.01)
  *G01P 15/14* (2013.01)
  *G01C 17/00* (2006.01)

(52) U.S. Cl.
  CPC ............ *G01C 21/165* (2013.01); *G01C 17/00* (2013.01); *G01P 15/14* (2013.01)

(58) Field of Classification Search
  CPC ....... G01C 21/165; G01C 22/00; G01C 21/16; G01C 17/00; G01F 3/0484; G01H 1/14; A61B 51/038; G01P 15/14
  USPC ........... 702/150, 141, 94; 701/472; 715/746; 73/649; 600/595
  See application file for complete search history.

(56) References Cited

U.S. PATENT DOCUMENTS

| | | | |
|---|---|---|---|
| 8,150,624 B2* | 4/2012 | Berardi | G01C 21/165 701/472 |
| 8,594,971 B2 | 11/2013 | Keal et al. | |
| 2003/0018430 A1* | 1/2003 | Ladetto | G01C 21/16 701/472 |
| 2011/0313716 A1* | 12/2011 | Smid | G01C 21/165 702/141 |
| 2012/0072166 A1 | 3/2012 | Keal | |

(Continued)

FOREIGN PATENT DOCUMENTS

| | | | | |
|---|---|---|---|---|
| WO | 2013089783 A1 | 6/2013 | | |
| WO | WO2013089783 | * | 7/2013 | ............. G01C 22/00 |
| WO | 2014010727 A1 | 7/2015 | | |

OTHER PUBLICATIONS

International Search Report Application No. PCT/IB2015/002200 dated Apr. 4, 2016.

*Primary Examiner* — Regis J Betsch
*Assistant Examiner* — Kaleria Knox
(74) *Attorney, Agent, or Firm* — McKinney Phillips LLC; Phillip Pippenger

(57) ABSTRACT

In an embodiment, a method and system are provided for determining a pedestrian position via dead reckoning on a portable device carried by the pedestrian (or "user"). The device has at least a processor, a 3D accelerometer, and a 3D gyroscope. The 3D accelerometer, and a 3D gyroscope are sampled to calculate device orientation, and then 3D accelerometer samples are gathered during a sensor time frame and an average step frequency is calculated. The user's speed and direction of movement are estimated and a device velocity is calculated relative to a prior device velocity via dead-reckoning. The estimated device velocity is corrected for drift and the pedestrian position is calculated based on the corrected estimated current device velocity.

33 Claims, 10 Drawing Sheets

(56) References Cited

U.S. PATENT DOCUMENTS

2014/0194138 A1 7/2014 Amizur et al.
2016/0030808 A1* 2/2016 Uchida .............. G06K 9/00342
  482/8

* cited by examiner

PEDESTRIAN DEAD RECKONING POSITION TRACKER

TECHNICAL FIELD

The present disclosure is related generally to navigation and, more particularly, to a system and method for accurately determining a pedestrian position based on dead reckoning.

BACKGROUND

Accurate position information from the Global Positioning System (GPS) has been available for civilian use since 2000 when GPS "selective availability" was discontinued. GPS receivers for consumer use found their natural application first in car navigation. More recently, after further development and miniaturization of electronics, GPS chips have been integrated into smart-phone devices as well, potentially enabling personal navigation to become accessible in everyday and always-on use.

However, while GPS positioning systems typically perform well in outdoor environments, such systems often fail or provide degraded performance in indoor or urban canyon environments due to occlusion and multipath problems. For this reason, indoor navigation, while desirable, is a daunting technological challenge that must be addressed before seamless all-day personal position tracking can be made available.

Moreover, even when reliable GPS is available, its use may be minimized to preserve device power; battery life is an important monitored resource in most smart phones. This problem becomes more pronounced with respect to the use of GPS chips in even smaller devices such as wrist mounted smart-watches. The batteries in such devices often have capacities as low as 200 mAh; thus, if GPS were to be used continuously in such a device, the battery would be depleted within a few hours.

While there have been attempts to cure these problems, they have only been at most partially successful. For example, in order to circumvent the poor performance of GPS in indoor environments, the possibility of using additional technologies such as WiFi, cellular network, Ultra-Wideband radio, etc., to provide positioning information has been explored. However, no such solution effectively provides effective indoor position tracking, due to poor accuracy or the need for dedicated infrastructure.

While the present disclosure is directed to a system that may eliminate the shortcomings noted in this Background section, it should be appreciated that no such benefit is a necessary limitation on the scope of the disclosed principles or of the attached claims, except to the extent expressly recited in a claim. Additionally, the discussion of technology in this Background section is reflective of inventor observations or considerations, and is not intended to be admitted or assumed prior art as to the discussed details. Moreover, the identification of the desirability of a certain course of action is the inventors' observation, and should not be assumed to be an art-recognized desirability. The citation of references is not intended to provide a broad and inclusive summary of the references, and nothing in the foregoing is intended to conclusively characterize any reference. Rather, only the references themselves are art, and this section is expressly disclaimed as art, prior or otherwise.

SUMMARY OF THE DISCLOSURE

In an embodiment of the disclosed principles, a method is provided for determining a pedestrian position via dead reckoning on a portable device carried by the user. In a further embodiment, the device includes at least a processor, a 3D accelerometer, and a 3D gyroscope. The dead reckoning process includes gathering 3D accelerometer samples and 3D gyroscope samples, estimating a device orientation, collecting further 3D accelerometer samples via the processor during a sensor time frame, calculating an average step frequency at the processor, estimating a user's speed and direction of movement, calculating a user (device) velocity with respect to a prior device velocity via dead-reckoning and correcting the estimated current velocity for drift. Subsequently, the user position is calculated based on the corrected estimated current device velocity.

In another embodiment, the device includes at least a processor, a 3D accelerometer and a 3D gyroscope. The pedestrian position process includes gathering 3D accelerometer samples and 3D gyroscope samples via the processor and calculating the device 3D orientation. In this embodiment, the processor is configured to gather further 3D accelerometer samples during a sensor time frame, integrate in time the further 3D accelerometer samples to calculate a current device velocity with respect to a prior device velocity via dead-reckoning, calculate an average step frequency and convert said step frequency into a speed of movement. Subsequently the processor determines components of the further 3D accelerometer samples along the plane normal to the gravity vector, determines a first direction along which the variance of said components is maximum together with said maximum variance, a second direction along which the variance of said components is minimum together with said minimum variance, and calculates a direction of movement along the plane normal to the gravity vector. The calculated current device velocity is then corrected for drift, and the user position is calculated based on the corrected estimated current device velocity.

Other embodiments and variations will be apparent from this disclosure, given its teachings and all logical equivalents of the disclosed features and functions.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

As noted above, there is currently no accurate and cost-effective way to provide indoor pedestrian positioning. In particular, GPS systems typically fail in indoor or occluded environments, while the use of supplemental data, i.e. from WiFi or other networks, has required specialized infrastructure that may not be universally available.

However, as will be explained, the use of inertial sensors as disclosed herein can enable always-on accurate personal navigation. As with GPS chips, inertial sensors are often integrated in Smartphone devices, and unlike GPS chips, inertial sensor systems have low power consumption. For example, commercially available consumer grade inertial measurement units (IMU) integrating 3D accelerometers and 3D gyroscopes can consume as little as 2-4 mA of current—about an order of magnitude lower than currently available GPS receiver chips used in low-power mode.

Figure 1:
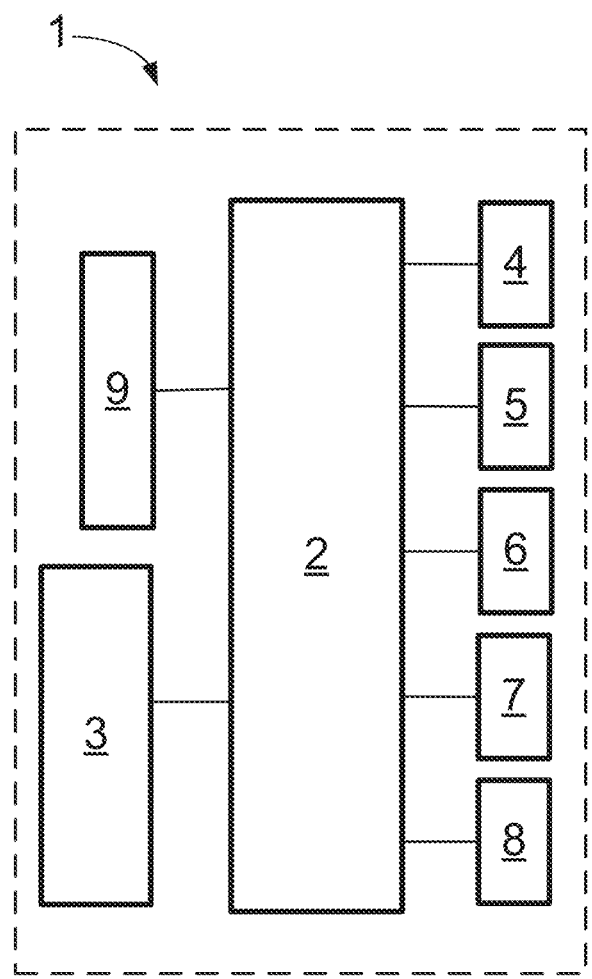
FIG. 1 is a schematic diagram of a device within which an embodiment of the disclosed principles may be implemented.

The user device may be any portable user-carried or user worn device. By way of example and for later reference, the simplified logical schematic of FIG. 1 shows a portable device including certain relevant modules and components. The illustrated device 1 includes a processor 2, a battery 3, a 3D accelerometer 4 and a 3D gyroscope 5. As well, the device 1 may optionally include a 3D magnetometer 6 and a pressure sensor 7. All elements may be consumer-grade products without affecting the effectiveness of the device 1.

In an embodiment, a wireless interface 8 is included within the device 1 in order to facilitate wireless transfer of data, configuration information or device status for example, between the device 1 and another device or network. The wireless interface 8 may operate via one or both of a short range wireless protocol such as Bluetooth and a longer range protocol such as a WiFi, WAN or cellular protocol. The device 1 may also include one or more on-board memory modules 9 for storing instructions (e.g., code), data, parameters and so on.

It will be appreciated that it is possible to calculate a position with respect to a starting point by twice integrating signals from 3D accelerometers expressed in a local frame with the gravity vector subtracted. This process may be referred to as dead-reckoning. The main drawback of this approach is the fast growing drift over time. For example, for consumer grade inertial sensors, dead-reckoning can provide accurate position results for a couple seconds before drift renders the positioning data unusable.

It is possible to reset the integration of the 3D accelerometer signals to velocity during zero velocity periods, thus limiting position drift to a few percent of traveled distance. However, detecting the zero velocity periods requires dedicated hardware mounted on a specific body part, which is impractical for most applications.

It is possible to place specific constraints on the inertial measurement unit, e.g., its placement on body, to proceed without detecting periods of zero velocity. For example, in U.S. Pat. No. 8,150,624B2, the inertial sensor is assumed to be mounted in a fixed relationship with respect to the user's torso; this allows a determination of the direction in which the user is walking based on the orientation of the inertial sensor. However, this approach is not useful in situations where the sensor group must be allowed to undergo arbitrary, non-constrained movement relative to the user's body, e.g., hand-held applications. A Smartphone could be in a pocket, in a purse, strapped to a belt, in a backpack, or just in the hand, either in front of the chest (e.g., when the user is looking at screen), or swinging naturally. A similar situation is presented for wearable devices such as smartwatches, or jewelry with integrated sensors.

Figure 2:
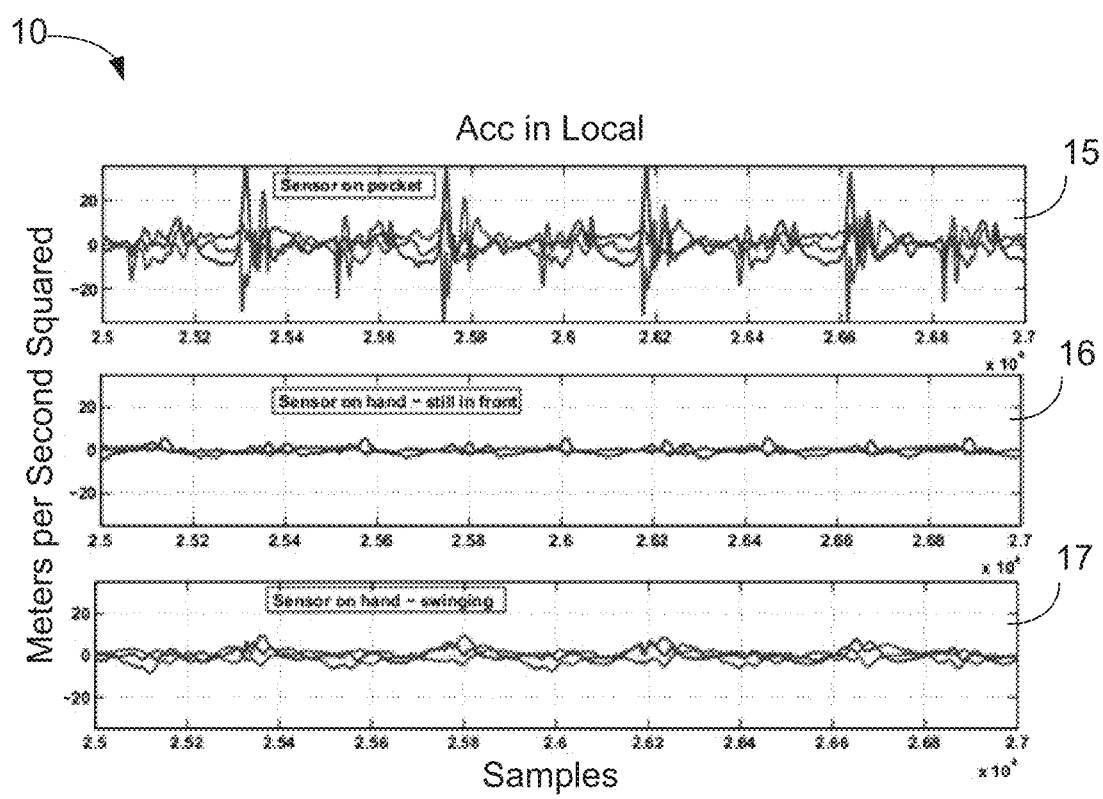
FIG. 2 shows a group of data plots representing accelerometer readings in a gravity referenced frame for different sensor placements during a typical walking pattern, i.e., in the user's pocket, in front of the user in the user's hand and in the user's hand swinging naturally.

In this connection, FIG. 2 shows accelerometer readings (in a gravity referenced frame) for different sensor placements on a body, during a typical walking pattern. In the top plot 15, the sensor or associated device is in the user's pocket, while in the middle plot 16, it is in front of the user in their hand. Finally, the bottom plot 17 represents the accelerometer readings with the device or sensor in the user's hand swinging naturally. The walking trial was the same in all three cases and the x-axis is aligned in the different plots 15, 16, 17.

Other PDR methods and systems rely on the detection of step events, either to stabilize the integration of inertial sensor signals as in US2014/0194138A1, or, together with an estimate of the user walking direction and a database of step profiles used to determine whether the walking pattern is associated with one or more walking patterns in the database (U.S. Pat. No. 8,594,971B2).

Such methods have been traditionally used in dedicated pedometer devices worn in a hip-pocket, on a belt, etc. However, they typically provide only suboptimal performance if the device is hand held or wrist mounted, since in this case step induced dynamics are usually largely dampened and hardly detectable. Moreover, pedestrian positioning is concerned with user motion, but not the specific dynamics of walking. For example, the user might occasionally take his phone from pocket while walking, e.g., to make a call. Depending on the specific imposed dynamics, detection of each single step might be difficult or impossible using traditional step detection based methods.

In overview, the disclosed principles allow the tracking of a person's position with respect to a starting point. The disclosed examples use a single sensing unit comprised of inexpensive and low-power 3D accelerometers and 3D gyroscopes, optionally integrated with 3D magnetometers and a pressure sensor. Using these facilities, position tracking is achieved with minimal drift in time without a need for additional external infrastructure or requiring GPS availability (although when available, other position aiding sources can optionally be integrated in order to achieve long term drift free position tracking). The disclosed methods allow the sensing unit to be arbitrarily placed with respect to the user's body, and the sensing unit orientation is non-constrained with respect to the user's walking direction.

With respect to step frequency and speed estimation, the disclosed methods first calculate an average step frequency $f_s$ starting from a set of accelerometer signals collected within a time interval of duration $T_w$. In an embodiment this set is represented by the norm of each 3D accelerometer sample in a sensor frame within $T_w$. In a different embodiment, the set is instead represented by 3D accelerometer samples expressed in a gravity referenced frame, with the gravity vector subtracted, i.e., the so called 3D free acceleration. The 3D free acceleration can be obtained by first calculating the device 3D orientation in a gravity referenced frame by means of known sensor fusion algorithms combining the readings from the available 3D accelerometers and 3D gyroscopes. In an implementation of this embodiment, either a 3D magnetometer or occasional GPS position updates could be additionally used to further correct for possible drift in the heading component of the device 3D orientation. While the first embodiment might be preferred for applications demanding low-complexity, e.g., in devices having available very limited memory and processing power, the second embodiment is generally preferable for applications demanding a high level of performance.

It will be appreciated that other variations of the foregoing embodiments may be better suited depending on specific system and application requirements. For example, in a specific implementation of the latter embodiment, only the acceleration components around vertical direction of the 3D free acceleration could be actually used, to minimize complexity. In a further alternative embodiment the set of accelerometer signals could instead be represented by the samples belonging to the channel which for example provides either the largest variations or the largest energy within $T_w$. In yet another embodiment, classification approaches are used to select the channel among the three that, for example, exhibits the clearest step induced dynamics vs. motions super-imposed by the user, in order to allow for more favorable step frequency detection probability.

With respect to estimation of the step frequency $f_s$, this can be accomplished in one of a number of ways. For example, in one embodiment, $f_s$ is calculated by first detecting the occurrence of each single step event and then calculating the number of step events within a unit of time. However, in a different embodiment, the step frequency is calculated as the inverse of the period between two consecutive step detections within $T_w$.

As noted above, however, single step events are difficult to discern, particularly with respect to hand-held applications. For this reason, in the preferred embodiment, the step-frequency is instead estimated by means of analysis of the frequency spectrum calculated from the same set of accelerometer signals collected within $T_w$. Depending on the size of the samples set and hardware and processing resources available, either direct calculation of Discrete Fourier Transform (DFT) coefficients, or implementation of more efficient Fast Fourier Transform (FFT) algorithms can be used.

Before going into the details of the different step frequency estimation methods, it is noted that calculating an average step frequency by analysis of the frequency spectrum of a set of accelerometer samples, instead of doing single steps event detection in the time domain, can provide several benefits when targeting applications in which the sensing unit is in an unconstrained relationship with respect to the person body. For example, under the assumption of periodic motion, as is the case during regular walking/running, the Fourier transform allows a processing gain for frequency components corresponding to periodic patterns (as induced in this case by steps), with respect to (undesired) dynamics super-imposed by (not step induced) user motion. These are typically non-periodic, but may have frequency content close to the step frequency. This allows much more favorable missed detection vs. false alarm performance curves, compared to traditional single step event detection approaches.

Having the full frequency spectrum available for further processing allows for more reliable estimates of step frequency $f_s$ with potentially less influence of the specific body position sensor placement on performance. Instead, specific step induced dynamics given a particular sensor placement can be meaningfully exploited. As example in this respect, when placing the sensor on pocket or on belt, the accelerometer readings are expected to have rather sharp spikes induced by each step, resulting in presence of several frequency harmonics at multiples of the step frequency (since high frequent components are typically only mildly dampened by the human body when the sensor is placed on such body locations). Therefore the algorithm can more accurately identify a candidate step frequency as the actual one, if for example several harmonics of it are actually present in the signal spectrum.

Figure 3:
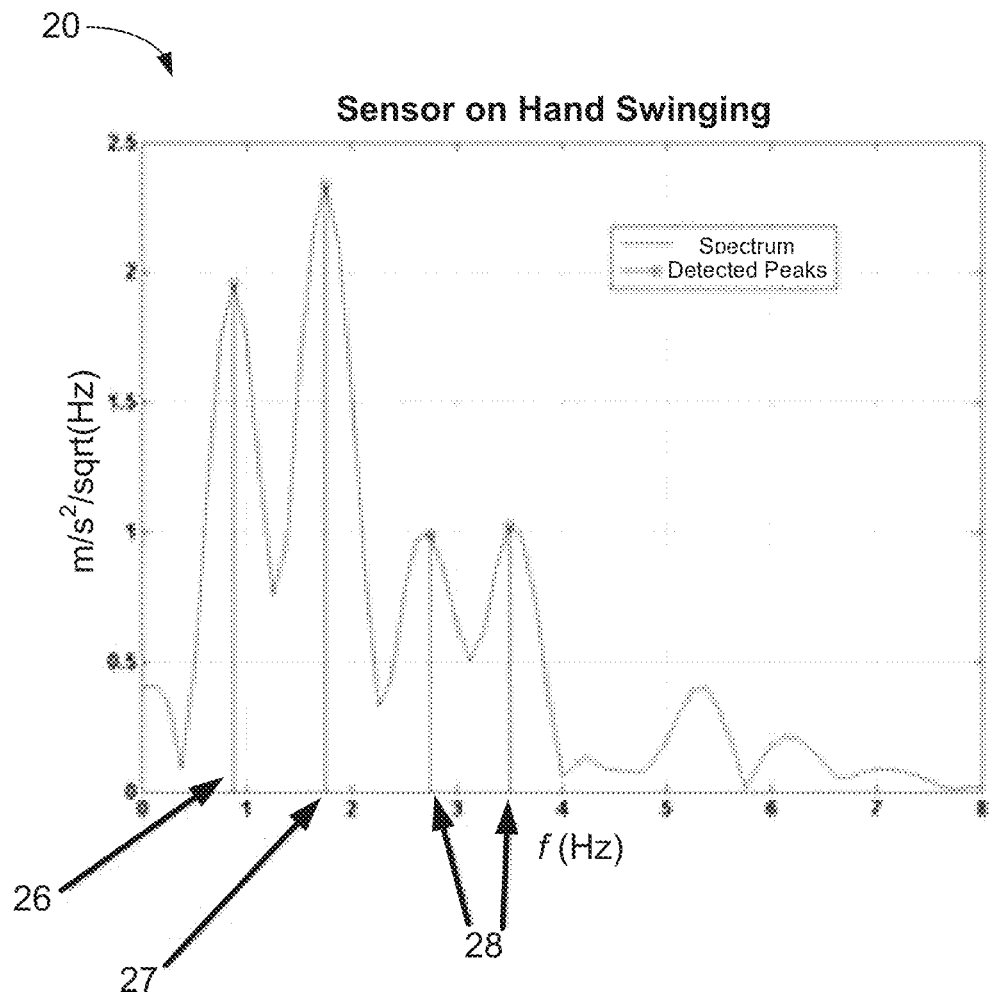
FIG. 3 shows a data plot representing an example frequency spectrum for the acceleration norm collected in the case of a sensor on a hand free to swing.

Similarly, if the sensor is on a swinging hand, components mostly around the stride frequency (i.e., half of the step frequency) will be present as a result of the hand swinging motion. By detecting peaks in the frequency region corresponding to half of the expected step frequency, superior performance can be achieved. For the sake of example, FIG. 3 shows an example frequency spectrum 20 for the acceleration norm collected in the case of a sensor on a hand free to swing. As can be seen, the frequency data include a peak 27 at the step frequency, a peak 26 at the stride frequency and various peaks 28 at harmonics of the stride frequency.

Since frequency analysis is performed within a full time interval $T_w$, super-imposed motions with duration much smaller than $T_w$, as may result from picking the sensing unit from the pocket and bringing it to the ear, are usually immaterial for the step frequency estimation algorithm, which will seamlessly continue to work properly under these cases.

In an embodiment, classification approaches are used to estimate the step frequency starting from the signal frequency spectrum. In this embodiment the full set of spectral samples may be used as features, for example to drive the output of a database of possible spectral profiles with associated a step frequency, collected in an off-line training phase. In a slightly different embodiment, only the frequency peaks, or the frequency peaks and the frequency valleys (i.e., local minima) are used in order to reduce the database features space. This can be important when memory and processing constraints are present. In yet a different embodiment useful in very low-power and low-complexity devices, the same features are used to instead drive a decision tree, to prevent the need for a database which may strain limited memory and processing resources.

In these various embodiments, the features calculated from the frequency spectrum may be used in combination with additional features extracted from the time domain signal in the same time interval $T_w$. This may be especially useful when considering the very complementary nature of information encoded in the time and frequency domain signal representation.

In a further embodiment, the step frequency could instead be simply detected as either the strongest peak or the first peak within a given frequency region. For example, in the case of walking, the step frequency is typically expected to be in the region between approximately 1.2 Hz and 2.4 Hz. This window is large enough to cover a wide variety of walking speeds, but at the same time sufficiently narrow to prevent ambiguity in peak detection as potentially resulting from commonly occurring simultaneous presence in the signal spectrum of peaks corresponding to either the stride frequency (which would occur in this case within the region of frequencies between 0.6 Hz and 1.2 Hz), or step frequency harmonics (the first one would occur in this exemplary case in the region between 2.4 Hz and 4.8 Hz).

While this simple method would be sufficient where the user is only walking, typical applications may demand support for running as well. The running step frequency is known to reach about 3 Hz for case of jogging and about 4 Hz for sprinting. In this scenario, a simple frequency peak search within the full region of expected step frequencies, as previously described, would likely provide erroneous results. For example a frequency peak at 1.6 Hz could either be a step frequency for slow walking, or a stride frequency for running (at a 3.2 Hz step frequency).

As such, in an embodiment, a sub-region of the overall interval in which the step frequency is expected is determined, before performing the actual step frequency detection. This can be achieved in various ways; in one scenario, classification approaches are adopted; in another scenario, various heuristics are used instead. In both cases, different signal features, from either time domain or frequency domain signal representations, may be employed. Without limiting the scope to these few exemplary cases, possible time domain features could be any of power, maximum amplitude, standard deviation, variance, mode, skew, or kurtosis, as evaluated from acceleration signals within a time interval. Examples of frequency domain features include maximum peak value, number of peaks, or number of valleys within a given frequency interval.

Figure 4:
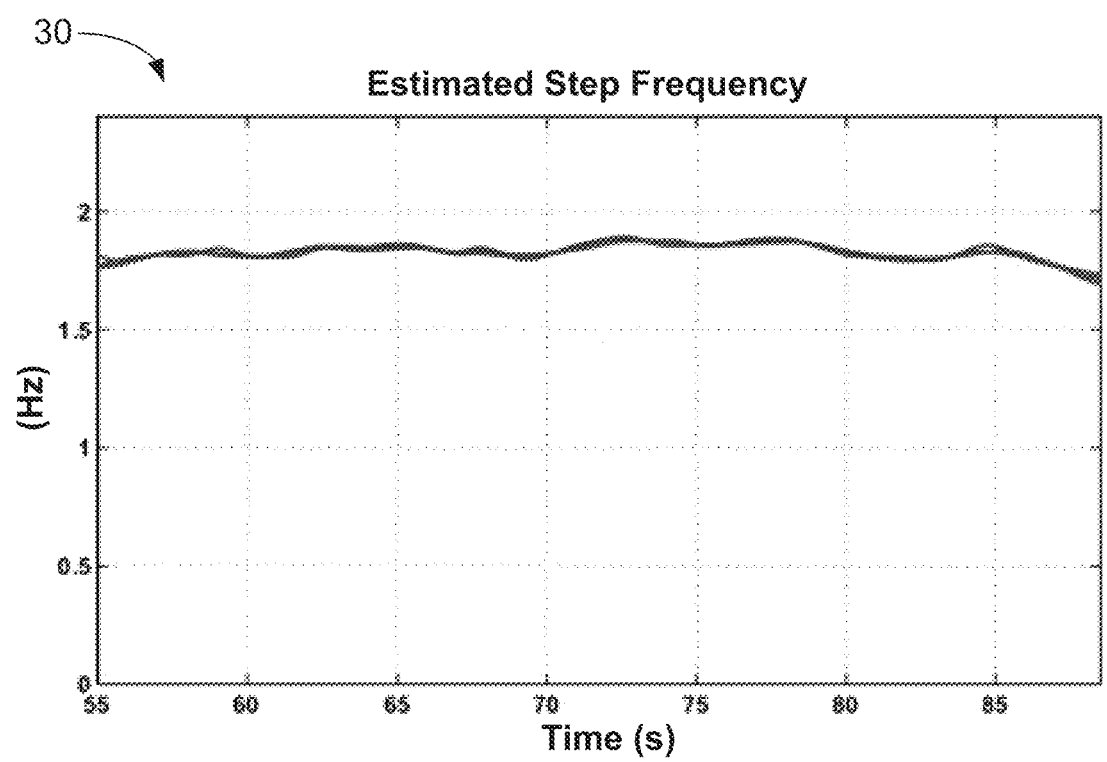
FIG. 4 is a data plot diagram showing an estimated step frequency using a frequency peak detection in keeping with an embodiment, for three different sensor placements on body, namely pocket, in-hand free to swing, and in-hand in front of the user.

For the sake of example, FIG. 4 shows a plot 30 of the estimated step frequency using a simple frequency peak detection, as previously discussed, for the same walking trial as shown in previous FIG. 2, and for the three different sensor placements on body (pocket, hand free to swing, and hand in front of the user). The plots are for a portion of a walking trial of about 30 seconds duration. As can be seen, the step frequency estimate appears particularly consistent between the three different body locations, in spite of the poorly observable step induced dynamics from time domain signals for the two cases of sensor in hand, as shown in FIG. 2.

With respect to the choice for $T_w$, depending on the specific application in place, $T_w$ may range from a couple up to several seconds. In most common applications, $T_w$ could be chosen as a fixed design value. However, alternative implementations could either employ a variable duration $T_w$, or perform simultaneous processing for different values of $T_w$. While the first scenario is especially suited for low complexity implementations, the second option might be preferred for applications demanding higher performance and robustness.

Further elaborating on the choice of the time interval used for frequency analysis, in an embodiment, the step frequency estimation algorithm could be performed from disjoint sets of accelerometer samples. In other words, the step frequency estimate could be output at the same period $T_w$. This approach would offer the advantage of allowing for a pipeline implementation, reducing processing and memory requirements. However, for applications demanding the highest level of performance, the step frequency estimate could be performed at rate higher than $1/T_w$, for example an integer multiple of it, improving the fidelity and responsiveness in step frequency estimation.

Having calculated the step frequency $f_s$, the proposed method further comprises converting said step frequency into a walking/running speed s. This could be done by known models, such as those that relate a step frequency with a preferred step length chosen by the subject during walking/running. Depending on complexity, such models could either be simple polynomial functions, with polynomial coefficients typically derived by fitting the model to empirical data, or more complex non-polynomial functions derived from biomechanical models of walking or running such models could typically depend on a diversity of user parameters including age, weight, sex, leg-length, body fat percentage, lean body mass, and height, just to mention few examples. More advanced models, for example particularly tailored to running applications, could also account for the level of training of the subject.

Such model parameters may be input by the user, e.g., in the form of a settings profile dedicated to the user. In alternative implementations, however, one or more of such parameters could be instead estimated with a dedicated calibration routine. For example the user might walk or run for a known reference distance, e.g., on a treadmill. Such reference distance is then used to adapt such parameters. In a different embodiment such parameters could instead be seamlessly estimated during actual use, with no input being required from the user; this could be especially practical in case of sporadic position updates, as may be available from sporadic GPS availability.

Figure 5:
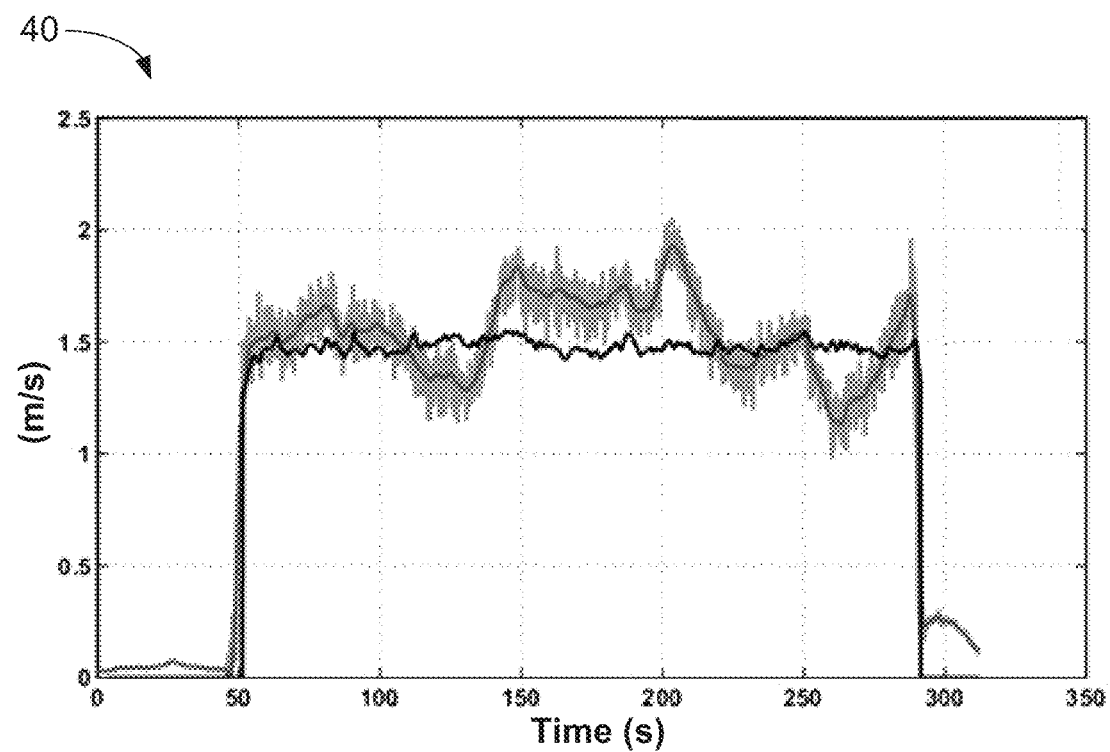
FIG. 5 is a data plot diagram showing a comparison of speed generated in accordance with the disclosed step-frequency estimation algorithm versus the speed (or velocity norm) generated from post-processed GPS data.

For sake of example, FIG. 5 shows the estimated walking speed with the proposed method, for a walking trial of about 5 minutes duration. A comparison of speed provided by the proposed step-frequency estimation algorithm vs. the speed (or velocity norm) from post-processed GPS solution (low-pass filtered for convenience in comparison). The subject was walking at an approximately constant speed of 1.5 m/s, demonstrating the superior accuracy of the disclosed method, with respect to GPS, which on the contrary shows rather noticeable fluctuations through the whole trial, likely caused by multipath affecting the quality of the GPS signals.

The disclosed method further comprises calculating a walking direction expressed in an external reference frame, as for example given by gravity (vertical direction) and magnetic North at a given geographical location. While calculating the walking direction in a three dimensional reference frame represents the most general scenario, in most common occurring cases, this problem can be isolated to only calculating the component of the walking direction on the horizontal plane of reference, i.e., the plane normal to the gravity vector. This case is considered in the following for sake of simplification, and because it will be appreciated that this is the most relevant scenario for practical applications. Optional further methods to address the cases in which the user might walk on a road with a significant vertical slope, or might walk upstairs or downstairs, are discussed later herein.

Even when no assumption can be made as to the mounting placement of the sensor on body and the specific relationship between sensing unit orientation and walking direction, a consideration with rather general validity can still be provided with respect to the acceleration components induced by walking or running. In fact, for most common placements of the sensing unit on the body, there will be a dominant direction of the acceleration components, actually aligned with the walking direction itself. For example, if the sensor is in a pocket, there will be strong accelerations induced by the stepping forward and backward; those accelerations are actually aligned with the walking direction itself. The person skilled in art will appreciate this by realizing that during typical walking, the actual velocity along the walking direction of most of the person' body segments actually exhibits a sinusoidal behavior in amplitude. Realizing that said velocity represents the integral of the acceleration components, one can see that such sinusoidal oscillations are actually induced by variations in acceleration along the same walking direction.

Capitalizing on this observation, by expressing acceleration components in an external reference frame, it is possible to estimate the walking direction in said external frame. The latter can be achieved by first calculating the sensing unit 3D orientation in the external frame, e.g., by known sensor fusion algorithms processing signals from a 3D accelerometer and a 3D gyroscope. In an implementation, either a 3D magnetometer or occasional GPS position updates could be additionally used to further correct for possible drift in the heading component of the 3D orientation.

In a simple embodiment, the walking direction is estimated as the direction aligned with the strongest energy components of the acceleration signals on the horizontal plane; this could be either done by time domain processing, or by frequency domain processing. While this approach is conceptually straightforward, it inherently relies on assumptions which are possibly prone to violation. For example, for the same case of sensor in a pocket, the sensor could shake in a direction different from the actual walking one during walking, e.g., due to its loose placement in the pocket. Such shaking would alter the acceleration energy components, resulting in biases in walking direction estimation.

Further, there will generally be body locations which will undergo less favorable accelerations induced by walking than other locations. For example, if the sensor is temporarily in the hand, held still in front of the chest, the body will tend to reduce and dampen such induced accelerations, and hence attempting to estimate the walking direction according to the principle previously disclosed could result in less reliable estimates. It is desirable to detect and then reject measurement outliers and provide information about reliability of the measurement and formulated assumption.

For this reason, in the preferred embodiment, a different method is used. In particular, the scatter-plot of the free acceleration components on the horizontal plane, collected within a time interval $T_p$, is first used to calculate a first direction along which the acceleration sample variance is maximized, in conjunction with said maximum variance, and a second direction along which the acceleration samples variance is minimized, in conjunction with said minimum variance. Those of skill in the art will appreciate that the directions along which the sample variance is minimum and maximum, and the respective minimum and maximum variances, can be calculated by using Principal Component Analysis (PCA) techniques.

If the measurements were free from outliers, then the minimum variance would be zero and the walking direction would be aligned with the direction along which the variance is maximum. However, the presence of outliers and violation of validity of formulated assumptions will result in a minimum variance which is non-zero and in an actual walking direction different from that along which the sample variance is maximum. For this reason, in the preferred embodiment, said directions aligned with the minimum and maximum variances and their respective variances are used, together with the original samples, to further estimate the actual walking direction.

In an embodiment according to this preferred method, the directions aligned with the minimum and maximum variances and their respective variances are used to first calculate a weighted distance of each of the acceleration samples with respect to the centroid of the original scatter-plot of acceleration samples. In this way, acceleration samples with the largest weighted distance are identified as measurement outliers and removed from the set of original samples. A new PCA on the remaining samples is then performed, enabling to achieve a more reliable final estimate of the walking direction.

In a further implementation according to this preferred method, the ratio between the maximum and minimum variances is used to test the validity of the assumption that acceleration components actually induced by walking are indeed mostly present in the scatter-plot of acceleration samples. If said ratio is large, it will indicate the presence in the signals of strong accelerations induced by walking, as may happen when walking with the sensor in a hip pocket or in case of regular running. This will suggest that the walking direction estimation based on analysis of acceleration components is reliable. On the other hand, if the ratio approaches one, it means that accelerations induced by walking will be weak and that the walking direction estimate is likely unreliable; this may happen for example in the case of slow walking with the sensor on hand in front of the user's chest. In this way the disclosed method enables verification of the validity of the formulated assumptions.

In one embodiment, the free acceleration is directly used according to the previously disclosed methods. In another embodiment, the free acceleration is instead first filtered within a given bandwidth of interest. For example, to further remove noise and high frequent artifacts, in one implementation the free acceleration is low-pass filtered within a bandwidth of about 4-5 Hz. In a different implementation, in order to achieve further robustness to low frequent dynamics not induced by walking, the free acceleration is instead band-pass filtered, for example around either the expected, or the estimated step frequency.

Figure 6:
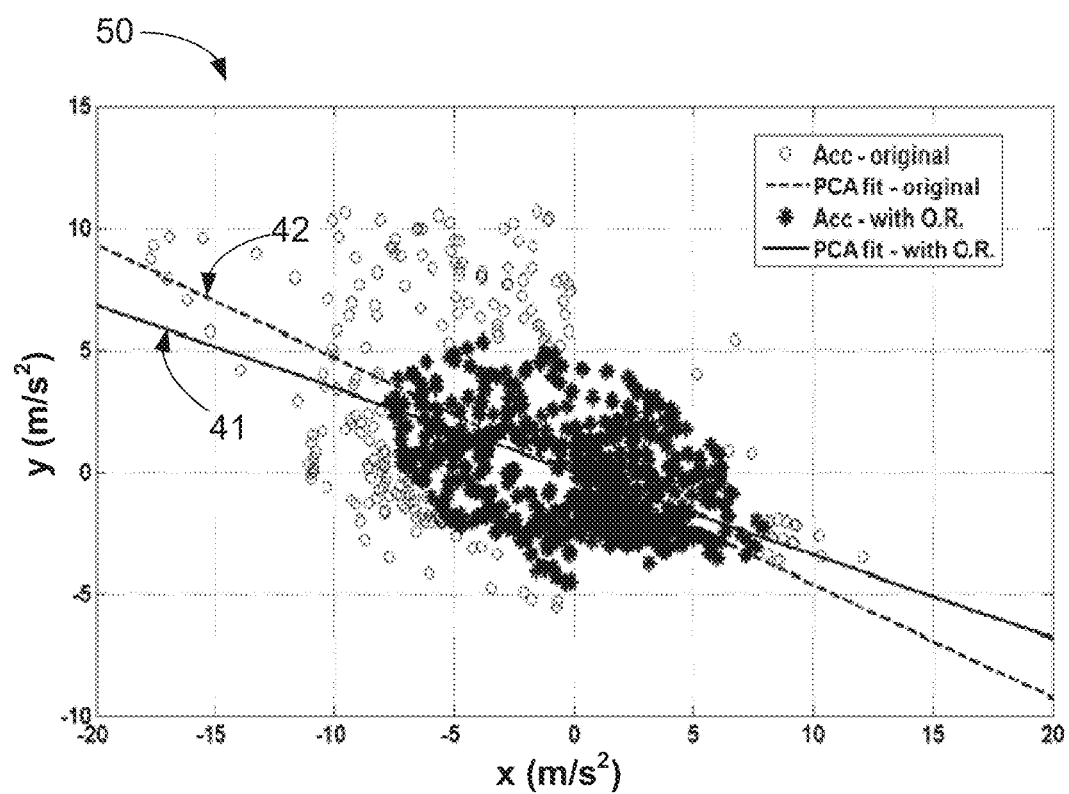
FIG. 6 is a scatter-plot showing components on the plane normal to the gravity vector of acceleration samples collected within a time interval in which the user is walking with the sensing unit in hand.

For sake of example, FIG. 6 shows a scatter-plot 50 of acceleration samples collected within a time interval in which the user was walking with the sensing unit in hand. The walking direction 42 estimated by PCA on the original data is also shown. The scatter-plot of the 75% of points with closest weighted distance from the original scatter-plot centroid, obtained after running a first time PCA, is shown. Via the dashed line, the walking direction 41 estimated in this latter case running PCA a second time on the remaining data is shown. It can be seen that the final walking direction estimate differs from the original one by about 10 degrees (and it is consistent with the ground truth walking direction), showing the capability of the disclosed method to effectively remove measurement outliers.

One factor to be accounted for in the described method is the ambiguity in walking direction estimation provided by PCA. With this method alone, it is difficult to decide whether the user is walking in a given direction, or in the same direction further rotated by 180 degrees. For particular cases, this limitation is solved by introducing further specific assumptions. For example, in case the sensor is placed in a known given body location, e.g., in a pocket or strapped to the torso, the components of the acceleration signals around the vertical and horizontal directions can be related together in order to infer the actual walking direction. Similarly, if the sensor is worn on the wrist and the user is running, the lower arm is expected to point towards the direction of run, providing means to solve for said ambiguity by simply looking at the sensor heading.

Using such techniques enables the system to track the position of the moving person with respect to a start point. For example, given an estimate of speed s and walking direction θ within an output period $T_p$, a new position can be calculated with respect to a previous position simply as:

$$p_x^{k+1}=p_x^k+T_p s \cos\theta; p_y^{k+1}=p_y^k+T_p s \sin\theta$$

for the x and y components, respectively.

While methods disclosed thus far do, alone, provide solutions to the directional ambiguity introduced by PCA under specific mountings of sensing unit on body, they do not necessarily represent a more general solution to the problem. For this reason, in the preferred embodiment, readings from the inertial sensors are first used to predict a new sensing unit velocity, with respect to a velocity at a previous instant, by dead-reckoning of the free-acceleration. This can be done by the velocity mechanization equation:

$$v^k=v^{k-1}+T_s a_L^k \qquad (1)$$

where $a_L^k$ is the 3D free acceleration, and $T_s$ is the sampling period of the free acceleration.

The previous equation is capable of providing a velocity estimate in an external reference frame, without any ambiguity. However, it may nonetheless suffer from rapidly growing drift. For example, for consumer grade sensors, results are typically accurate only for time intervals up to several seconds.

For this reason, in the disclosed method, the estimates of speed s and walking direction θ, as detailed previously, are used within a tracking framework as measurement updates to correct for such drift, in order to enable stable walking velocity tracking.

In an embodiment, the speed update s and walking direction update θ are combined together, in order to allow formulation of a vector velocity update:

$$y_v^k = s \begin{pmatrix} \cos\theta \\ \sin\theta \end{pmatrix} \cdot \text{sign}(v_x^k \cos\theta + v_y^k \sin\theta)$$

according to the measurement model:

$$y_v^k = v^k + n_v^k$$

While such formulation offers the advantage of providing a linear measurement update, it has the drawback of not directly allowing for an explicit outlier rejection for either the speed or walking direction updates separately, nor of allowing application of only one of the two updates. For this reason, in an alternative embodiment, the speed and direction updates are instead formulated independently, according to the following measurement models:

$$y_s^k = |v^k| + n_s^k, \quad y_\theta^k = \text{atan}\left(\frac{v_y^k}{v_x^k}\right) + y_0^k + n_\theta^k$$

with $y_0^k$ in $[0, \pi, -\pi]$, chosen such that $$\left| y_\theta^k - \text{atan}\left(\frac{v_y^k}{v_x^k}\right) - y_0^k \right|$$

is minimized. The previous equations can be linearized with Jacobians given respectively by:

$$\frac{\delta y_s^k}{\delta v^k} = \frac{v^k}{|v^k|}, \quad \frac{\delta y_\theta^k}{\delta v^k} = \frac{(-v_y^k + v_x^k)}{|v^k|^2}$$

The choice of any of the two possible formulations will be dependent on the specific application, available processing resources and required performance.

Upon tracking the walking velocity, the user position can be trivially further calculated as $$p_x^{k+1}=p_x^k+T_p v_x^k; p_y^{k+1}=p_y^k+T_p v_y^k \qquad (2)$$

In one embodiment, eq. (2) is used to always update the user position, independent of the actual value of the estimated step frequency. In a different embodiment, however, eq. (2) is instead used only in case the estimated step frequency actually differs from zero. The latter embodiment will typically provide more stable position tracking performance.

Those of skill in the art will appreciate that the approach discussed in this section is ideal to exploit further measurement updates, when available. For example, if no-steps or a stillness condition are detected, either well-known zero velocity updates (ZUPT) or position updates could be used to stabilize drift in these cases.

In a further embodiment, a pressure sensor is used, together with inertial prediction, in order to additionally provide drift free height tracking. This may be especially relevant for applications demanding tracking of vertical changes in position as well, such as when the user is taking stairs, taking an elevator, or walking/running on a road with a vertical slope. According to this further embodiment, the z-component of the user position can simply be predicted by twice integrating the z-channel of the free acceleration as:

$$p_z^{k+1} = p_z^k + T_s v_z^k + \frac{T_s^2}{2} a_{L,z}^k \qquad (3)$$

The pressure sensor output can be used to provide a measure for the sensing unit height, using e.g., the well-known pressure-to-height model:

$$h = c_1\left(1 - \left(\frac{b}{b_0}\right)^{c_2}\right)$$

where b is the pressure sensor reading, h is the corresponding height estimate, and $b_0$, $c_1$ and $c_2$ are constants. Such measure can be used to correct for drift in the predicted vertical position in eq. (3) according to the linear measurement model:

$$y_h^k = p_z^k + n_h^k$$

In an optional embodiment, vertical changes in position are directly combined with horizontal changes in position in order to provide full 3D position tracking.

In a different embodiment, the vertical changes in position are instead further used in combination with the output of the step frequency estimate, to additionally adapt the step frequency to velocity model described above. This may be beneficial in order to increase the accuracy of the model in case the user is walking or running on a road with significant slope, or to switch to a different dedicated model in case the user is for example walking upstairs/downstairs.

In one embodiment of the described method, for example demanding for a low complexity implementation, a loosely coupled approach is used to predict the velocity in eq. (1). While this approach has the advantage of requiring a minimal number of states to be tracked over time (e.g., as few as two, corresponding to the horizontal components of velocity), and thus requiring only moderate processing requirements, it presents the drawback of not being capable of realistically accounting for overall statistical uncertainties, as for example resulting from sensor biases or orientation errors, which will affect the calculation of the free acceleration and hence the accuracy of the velocity estimate. As a result, the achieved performance may be suboptimal.

For this reason, in an alternative embodiment, a tightly coupled formulation is used instead, in which additional states as orientation errors, gyroscope or accelerometer biases are tracked as well. This approach may be preferred in applications demanding the highest level of performance. Such a tracking framework may be a traditional Kalman filter, or may be implemented within more complex Bayesian estimation or non-linear optimization frameworks. While the first may be ideal for real-time, low-complexity implementations, the second may be especially suited for higher performance, moving horizon or off-line implementations.

It will be appreciated that the use of inertial prediction, in combination with the measurement updates provided by the speed and walking direction estimation methods previously disclosed, enables numerous benefits. These include, for example, resolving the 180 degrees ambiguity resulting from walking direction estimation by analysis of acceleration components, which would otherwise prevent direct use of these methods in the most general case in which the sensor is arbitrarily placed on the body and the sensor heading is un-constrained with respect to the walking direction.

Moreover, the inertial prediction can bridge short gaps in reliable aiding measurements, removing the need for continuous and outlier-free speed and direction of movement updates. Also, since inertial prediction can be rather accurate within short times, it is possible to implement reliable outlier rejection schemes, allowing more robust overall performance, especially in cases in which only one of the two updates (e.g., typically the walking direction update) is not reliable.

Although not the main focus of the disclosure, other aiding sources, including GPS position and velocity measurements, WiFi positioning and odometer measurements, or location maps, can be straightforwardly (optionally) included when available. As such, the disclosed PDR methods described in detail hereby are useful to address limitations and problems caused when the sensing unit is arbitrarily placed on the body and the sensing unit heading is un-constrained with respect to the walking direction.

While it is apparent for the applications considered herein that the sensing unit heading generally cannot be directly used to infer the user walking direction, it is still possible to use the device heading information in many cases, without violating the general applicability of the proposed framework to the scenario in which no deterministic assumption can be made in terms of relationship between device heading and person walking direction.

For example, consider the case in which the sensing unit is placed in a pocket. In this case the sensing unit device heading alone would bring very little information of direct use for walking direction estimation, for a number of reasons. For example, the sensing unit heading might oscillate over time, as resulting for example from shakes (not aligned with the walking direction) induced by each step. Moreover, the sensing unit heading will generally differ on average with respect to the walking direction by an unknown offset. Such offset may slowly change over time, due to slipping of sensing unit inside the pocket or other factor.

In addition to the aforementioned limitations, the user might induce a significant change in placement of the sensing unit on body, as e.g., occurring upon taking the sensing unit out of pocket and keeping it in the hand. This would result in a sudden and large change in angle between sensor heading and walking direction.

While no specific deterministic assumptions can be made on said relationship due to the aforementioned limitations, in a further optional embodiment of the disclosed methods, sensing unit heading α and walking direction θ are instead statistically coupled together. Such statistical modeling is useful to further stabilize the walking direction estimate.

Coming to the details of such further embodiment, in the most general scenario, sensing unit heading and walking direction, the latter in the following shortly denoted as bearing for conciseness, could be related at sample time k by the following generic model:

$$\alpha^k = \theta^k + \varphi^k$$

where φ is defined as the angle difference between sensor heading and walking bearing, and in the most general case can be modeled as a non-stationary random process.

In one embodiment, φ is a random walk process, where the state is predicted over time according to the model:

$$\varphi^k = \varphi^{k-1} + w^k$$

with $w^k$ being the process noise at generic time step k.

The heading update can be formulated in this case according to the following non-linear measurement model:

$$y_\alpha^k = \operatorname{atan}\left(\frac{v_y^k}{v_x^k}\right) + \varphi^k + n_\alpha^k$$

The previous equation can be linearized with Jacobians given by:

$$\frac{\delta y_\alpha^k}{\delta v^k} = \frac{(-v_y^k + v_x^k)}{|v^k|^2}, \frac{\delta y_\alpha^k}{\delta \varphi^k} = 1$$

It becomes apparent that, depending on the specific value for the process noise $w^k$ at sample time k, the disclosed model naturally accounts for slow fluctuations in φ, as may be caused by a slow slipping of sensing unit when for example placed in pocket.

In a further embodiment to allow for an arbitrary and not a-priori known angle between the sensing unit heading and bearing, φ is initialized to an arbitrary value, associated with a very large uncertainty. Upon applying over time both heading updates and bearing updates, φ converges to a stable value around its ground truth, and its uncertainty accordingly decreases.

In order to account for zero mean variations of heading with respect to bearing, in a further embodiment, the noise for the heading measurement update is chosen large enough. In an alternative embodiment, in order to address the same problem, heading measurements are first preprocessed, e.g., by either a mean or a median filter. In yet another embodiment, PCA is used instead to estimate a dominant direction of the heading measurements within an interval, in similar fashion as previously disclosed for the case of walking direction estimation.

An advantage of further using statistical coupling of sensor heading with bearing lies in the potential to increase estimation robustness, for example during periods in which the estimate of walking direction from PCA of acceleration components might temporarily be very noisy. This could be the case for example when the sensor is hand-held. The reader skilled in the art will however realize that the direct use of these models without any further specific care, could result in dramatic degradation in performance in cases in which the user suddenly imposes a change in sensing unit heading with respect to walking direction. Handling these cases is however conceptually straightforward for most practically occurring scenarios. For example, in one embodiment, traditional outlier rejection applied to the heading measurement update residuals is used.

Upon detecting an outlier, the process noise of φ is increased, to allow the system to quickly adapt to a new coupling of sensor heading vs. bearing. Upon said coupling converging to a stable value again, the uncertainty in φ will be reduced as resulting from applying heading and bearing updates. This allows for a re-initialization of the estimate for φ, making it possible to regain stable walking direction tracking.

Figure 7:
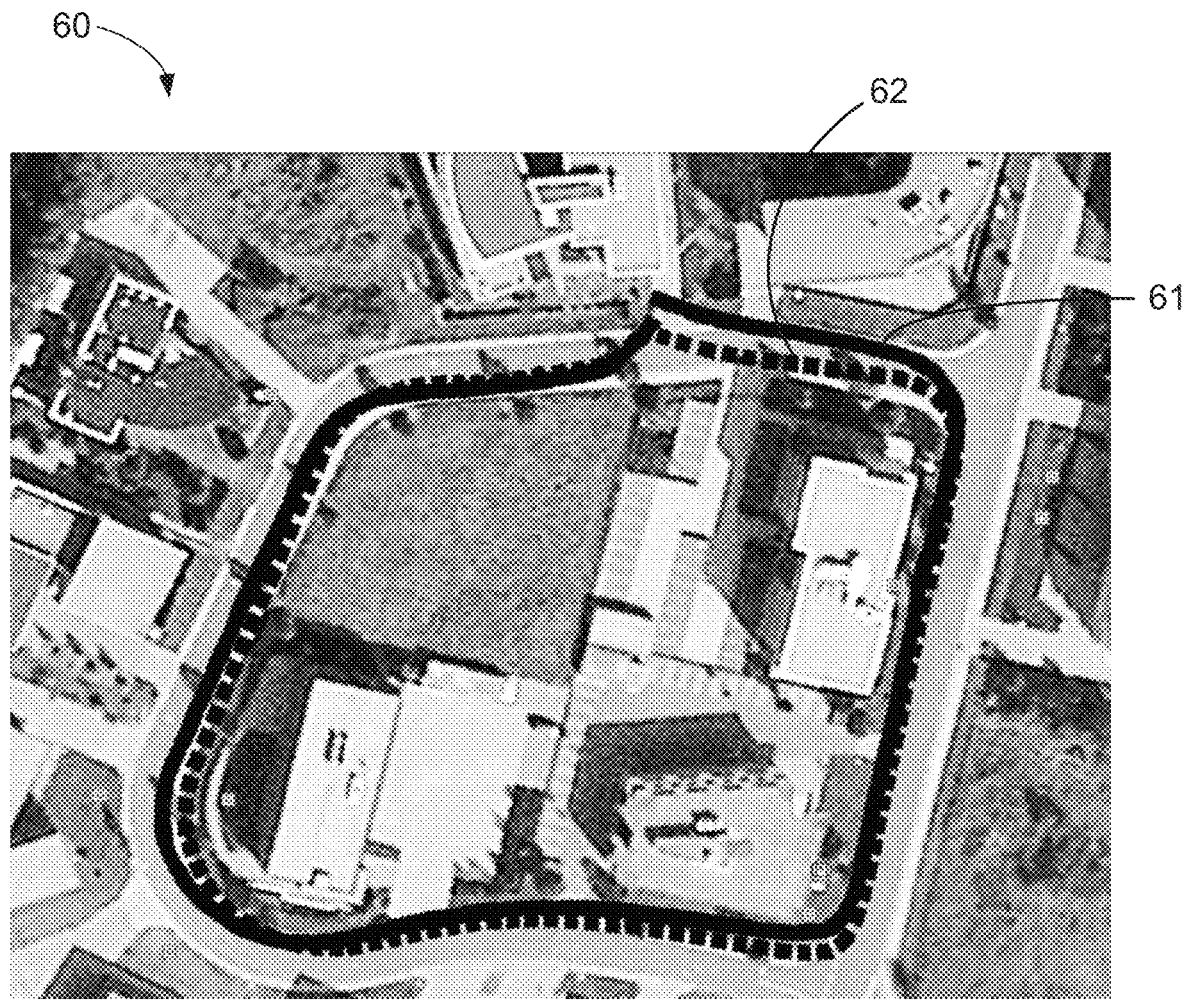
FIG. 7 shows an estimated walking trajectory while the sensing unit is in the pocket of the user, when only the bearing update is used to estimate the walking direction and when the sensing unit heading is coupled to the walking direction.
Figure 8:
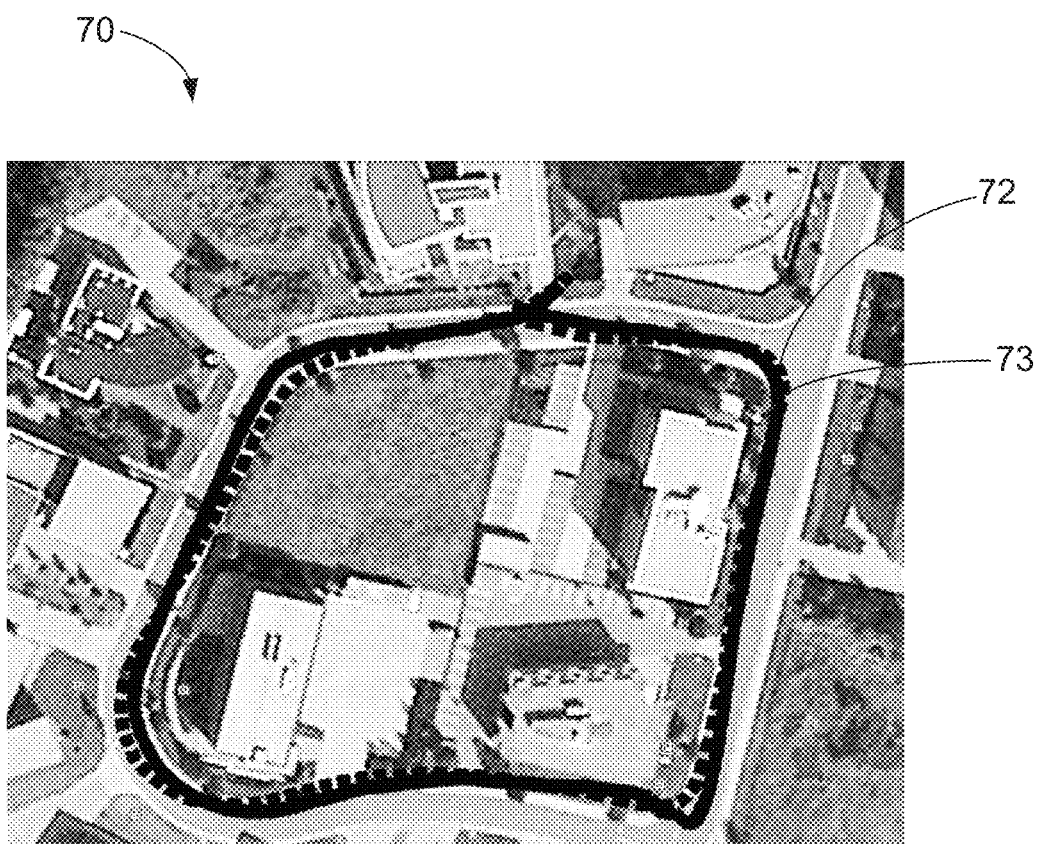
FIG. 8 shows an estimated walking trajectory with the sensing unit in the user's hand, free to swing naturally, when only bearing update is used to estimate the walking direction and when the sensing unit heading is coupled to the walking direction.

A selection of examples may serve to better illustrate the results of the disclosed pedestrian dead reckoning process. To this end, FIG. 7 shows an estimated walking trajectory 60 while the sensing unit is in the pocket of the user, while FIG. 8 shows an estimated walking trajectory 70 while the sensing unit is in the user's hand, free to swing naturally. The device associated with the first example may be, for example, a Smartphone device. Similarly, the device associated with the second example may be, for example, a wrist mounted smart-watch.

In both examples, the results of two different embodiments of the disclosed system and method are shown. Specifically, in both figures, the solid trace 61, 71 shows the walking trajectory when only the bearing update is used to estimate the walking direction. In contrast, the dashed trace 62, 72 shows the walking trajectory using the further assumption that the sensing unit heading is coupled to the walking direction. As can be seen, while the two methods result in similar performance for the case of the sensor in the user's pocket, some improvements are noticeable using heading updates when the sensor is in the user's hand. Such improvements can be seen, for example, in the bottom right corner of the walking trajectory, which follows the actual road better with the latter method.

It is worthwhile to emphasize again that in this case no specific deterministic information on the angle between sensing unit heading and walking bearing is used. Instead, such angle is estimated in-run by the proposed method, preserving the usability of this approach in practical scenarios in which the sensing unit is unconstrained on the user's body.

It will be appreciated that the disclosed methods and principles are implemented in a computing device, i.e., a device having a processor, by the execution of computer-executable instructions read from a computer-readable medium. While such media may be either transitory or non-transitory, in a preferred embodiment the computer-executable instructions are stored on and read from a non-transitory medium such as a hard drive, flash memory, optical memory, programmed array, random access memory, read only memory, alterable read only memory and so on.

Figure 9:
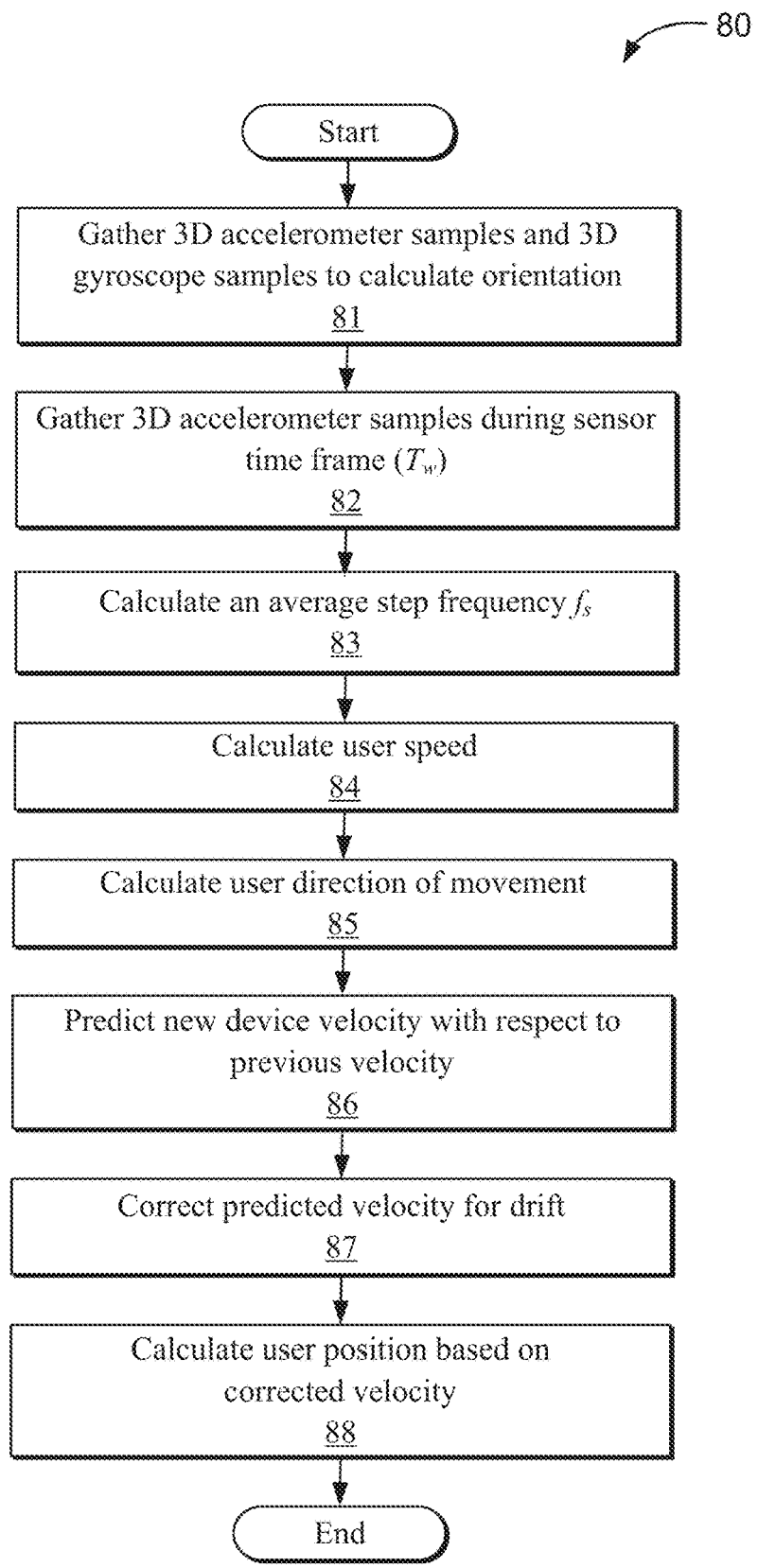
FIG. 9 is a flow chart showing a process for deriving a user position based on dead reckoning in accordance with embodiments of the disclosed principles.
Figure 10:
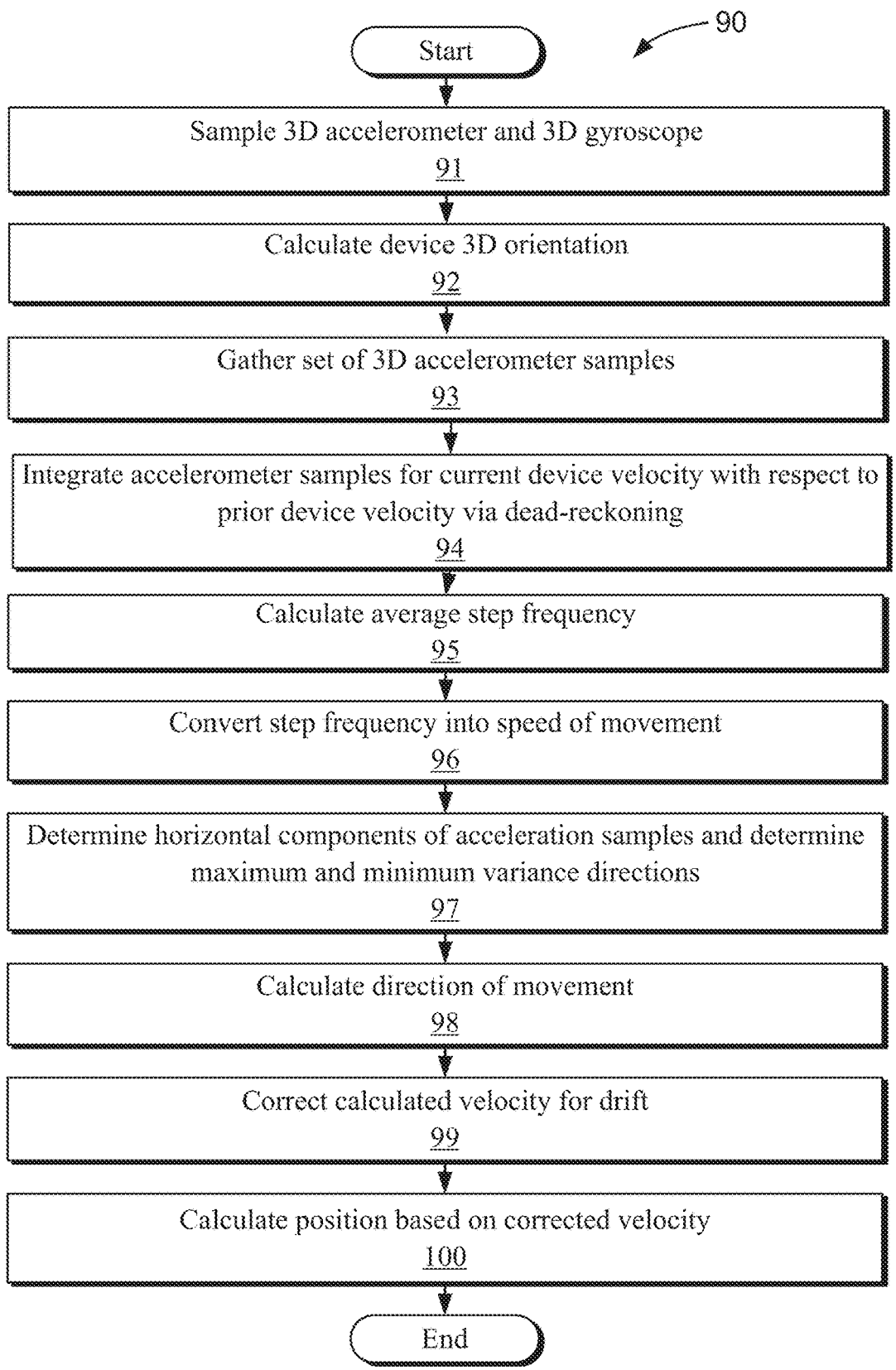
FIG. 10 is a flow chart showing an alternative process for deriving a user position based on dead reckoning in accordance with embodiments of the disclosed principles.

While the disclosed methods may be implemented via various different processes, the flow chart of FIG. 9 shows an exemplary process 80 for determining a pedestrian position via dead reckoning. At stage 81 of the process 80, the device processor gathers 3D accelerometer samples and 3D gyroscope samples to compute a device orientation. The device collects further 3D accelerometer samples during a sensor time frame Tw via the processor at stage 82. As noted above, the 3D accelerometer samples may be expressed in a gravity referenced frame.

The processor then calculates an average step frequency $f_s$ at stage 83 of the process 80 and calculates the user speed and direction of movement at stages 84 and 85 respectively. A new device velocity (sensing unit velocity) is then predicted at stage 86 with respect to a velocity at a previous instant, e.g., via dead-reckoning of the free-acceleration, and the predicted velocity is corrected for drift at stage 87 of the process 80.

At stage 88, the user position is calculated based on the corrected velocity. It will be appreciated that the processor may update the user position independently of the actual value of the estimated step frequency, or may update the user position only when the estimated step frequency is non-zero. This process of updating the user position is then repeated at an update interval to maintain current position data.

As noted above, in an alternative embodiment, the user device includes a processor, a 3D accelerometer and a 3D gyroscope. In this embodiment, the pedestrian position process 90 includes the processor sampling, in time, the 3D accelerometer and the 3D gyroscope at stage 91, calculating the device 3D orientation at stage 92. The processor gathers additional 3D accelerometer samples during a sensor time frame at stage 93 and integrates in time the accelerometer samples to calculate a current device velocity with respect to a prior device velocity via dead-reckoning at stage 94. The processor calculates an average step frequency at stage 95. At stage 96, the step frequency is converted into a speed of movement.

Subsequently the processor determines components of the set of 3D accelerometer samples along the plane normal to the gravity vector at stage 97, determining a first direction along which the variance of said components is maximum together with said maximum variance, a second direction along which the variance of said components is minimum together with said minimum variance. At stage 98, the processor calculates a direction of movement along the plane normal to the gravity vector. The calculated current device velocity is then corrected at stage 99 for drift, and the user position is calculated at stage 100 based on the corrected estimated current device velocity.

It will be appreciated that a system and method for calculating a pedestrian position via dead reckoning have been disclosed. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method of determining a pedestrian position via dead reckoning on a portable device carried by a user, the device including at least a 3D accelerometer, a 3D gyroscope and a processor, the processor being configured to gather 3D gyroscope samples and 3D accelerometer samples, the method comprising:
- determining a device orientation based on 3D gyroscope samples and 3D accelerometer samples;
- collecting further 3D accelerometer samples during a sensor time frame TW via the processor;
- determining an average step frequency $f_s$;
- determining an estimated user speed based on $f_s$;
- determining an estimated user direction of movement based on the further 3D accelerometer samples;
- determining a device velocity with respect to a prior device velocity via dead-reckoning;
- correcting the estimated velocity for drift via using at least one of the estimated user speed and the estimated user direction of movement; and
- determining the user position by the processor based on the corrected estimated velocity.

2. The method of determining a pedestrian position via dead reckoning in accordance with claim 1, further comprising updating the user position independent of the actual value of the estimated step frequency $f_s$.

3. The method of determining a pedestrian position via dead reckoning in accordance with claim 1, further comprising updating the user position only when the estimated step frequency $f_s$ is non-zero.

4. The method of determining a pedestrian position via dead reckoning in accordance with claim 1, wherein the steps of claim 1 are repeated at an update interval to maintain current position data.

5. The method of determining a pedestrian position via dead reckoning in accordance with claim 1, wherein the further 3D accelerometer samples are expressed in a gravity-referenced frame.

6. The method of determining a pedestrian position via dead reckoning in accordance with claim 1, wherein the portable device carried by the user includes a 3D magnetometer and wherein the further 3D accelerometer samples are expressed in a frame determined by gravity and magnetic North.

7. The method of determining a pedestrian position via dead reckoning in accordance with claim 1, wherein $f_s$ is estimated by means of analysis of the frequency spectrum of the norm of the further 3D accelerometer samples or of any of the components of the further 3D accelerometer samples expressed in a gravity referenced frame.

8. The method of determining a pedestrian position via dead reckoning in accordance with claim 7, wherein the frequency spectrum is calculated by one of a Discrete Fourier Transform and a Fast Fourier Transform.

9. The method of determining a pedestrian position via dead reckoning in accordance with claim 7, wherein the frequency spectrum analysis comprises employing one of a database, classification system, and frequency peak detection in a predetermined frequency window.

10. The method of determining a pedestrian position via dead reckoning in accordance with claim 1, wherein estimating the user speed based on $f_s$ comprises deriving model parameters to convert $f_s$ to speed of movement.

11. The method of determining a pedestrian position via dead reckoning in accordance with claim 10, wherein GPS position updates are available and the model parameters are estimated during use based on a comparison of GPS-based position values and the determined user position.

12. The method of determining a pedestrian position via dead reckoning in accordance with claim 1, wherein estimating the user direction of movement based on the further 3D accelerometer samples comprises determining the direction along which the components of the further 3D accelerometer samples on the plane normal to gravity have maximum energy.

13. The method of determining a pedestrian position via dead reckoning in accordance with claim 1, wherein correcting the estimated velocity for drift via using at least one of the estimated user speed and the estimated user direction of movement comprises generating one of a speed update, a direction of movement update, and a velocity update obtained via a combination of a speed update and a direction of movement update.

14. The method of determining a pedestrian position via dead reckoning in accordance with claim 1, wherein one or more of GPS, WiFi, cellular network, and a map are used to correct the user position.

15. The method of determining a pedestrian position via dead reckoning in accordance with claim 1, further comprising applying one or both of a zero velocity update and a position update when one or both of stillness and a non-stepping condition are detected.

16. The method of determining a pedestrian position via dead reckoning in accordance with claim 1, wherein the device orientation is determined in a gravity referenced frame via sensor fusion of 3D accelerometer and 3D gyroscope samples.

17. The method of determining a pedestrian position via dead reckoning in accordance with claim 16, further comprising using a 3D magnetometer and determining device orientation in a frame defined by gravity and magnetic North reference.

18. The method of determining a pedestrian position via dead reckoning in accordance with claim 1, wherein the device heading is further used to correct for drift in estimated velocity.

19. The method of determining a pedestrian position via dead reckoning in accordance with claim 18, wherein correcting for drift in estimated velocity comprises predicting in time an angle difference between direction of movement and device heading, and applying a device heading measurement update to estimate said angle difference.

20. The method of determining a pedestrian position via dead reckoning in accordance with claim 1, wherein the device further includes a pressure sensor, and wherein the method further includes correcting a vertical component of the user position for drift using the pressure sensor.

21. The method of determining a pedestrian position via dead reckoning in accordance with claim 1, wherein the pedestrian position is determined with respect to a pedestrian starting position.

22. A device configured to determine via dead reckoning a position of a user carrying the device, the device comprising:
- a 3D accelerometer;
- a 3D gyroscope; and
- a processor configured to gather 3D gyroscope samples and 3D accelerometer samples, the processor being further configured via computer executable instructions to execute steps comprising:
- determining a device orientation;
- collecting during a sensor time frame TW via the processor further 3D accelerometer samples;
- determining an average step frequency $f_s$;
- determining an estimated user speed based on $f_s$;
- determining an estimated user direction of movement based on the further 3D accelerometer samples;

determining a device velocity with respect to a prior device velocity via dead-reckoning;

correcting the estimated velocity for drift via using at least one of the estimated user speed and the estimated user direction of movement; and determining the user position by the processor based on the corrected estimated velocity.

23. The device in accordance with claim 22, further comprising updating the user position independent of the actual value of the estimated step frequency $f_s$.

24. The device in accordance with claim 22, further comprising updating the user position only when the estimated step frequency $f_s$ is non-zero.

25. The device in accordance with claim 22, wherein the processor is further configured to repeat the listed operations at an update interval to maintain current position data.

26. The device in accordance with claim 22, wherein the further 3D accelerometer samples are expressed in a gravity-referenced frame.

27. The device in accordance with claim 22, further comprising any of a 3D magnetometer and a pressure sensor.

28. The device in accordance with claim 27 wherein calculating the device orientation further comprises using the 3D magnetometer to determine an externally-referenced direction.

29. The device in accordance with claim 27, wherein calculating the user position further comprises using the pressure sensor to determine device height.

30. The device in accordance with claim 29, wherein using the pressure sensor to determine device height further comprises adapting the model to convert step frequency $f_s$ to speed of movement.

31. The device in accordance with claim 22, wherein the user position is determined with respect to a user starting position.

32. A non-transitory computer-readable medium having thereon computer executable instructions for determining a pedestrian position via dead reckoning on a portable device carried by the pedestrian, having a processor linked to a 3D accelerometer and a 3D gyroscope, the instructions comprising:

instructions for sampling the 3D accelerometer and the 3D gyroscope at the processor and determining a device orientation based on the collected samples;

instructions for gathering further 3D accelerometer samples at the processor in a time frame $T_W$;

instructions for determining an average step frequency $f_s$ at the processor;

instructions for determining a user speed based on $f_s$ and a user direction of movement;

instructions for determining an estimated current device velocity with respect to a prior device velocity via dead-reckoning;

instructions for correcting the estimated current device velocity for drift; and instructions for determining the user position by the processor based on the estimated velocity.

33. The non-transitory computer-readable medium in accordance with claim 32, wherein the pedestrian position is determined with respect to a pedestrian starting position.

* * * * *